Oct. 18, 1949.  R. C. ZEIDLER  2,484,869
REVERSIBLE PLURAL CLUTCH DRIVE
Filed Jan. 1, 1944  4 Sheets-Sheet 1
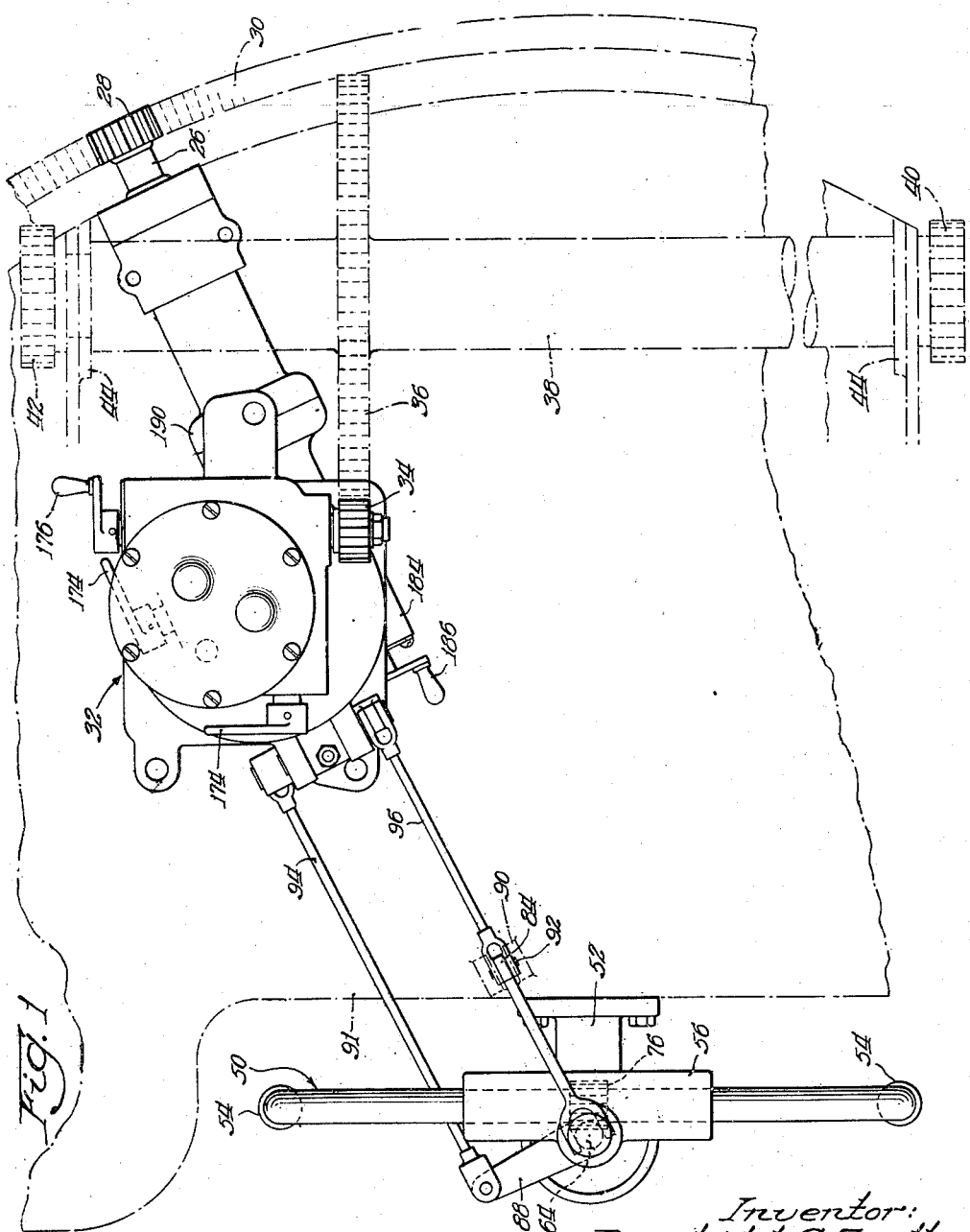
Inventor:
Reinhold C. Zeidler
By: Edward C. Driscough
Atty.

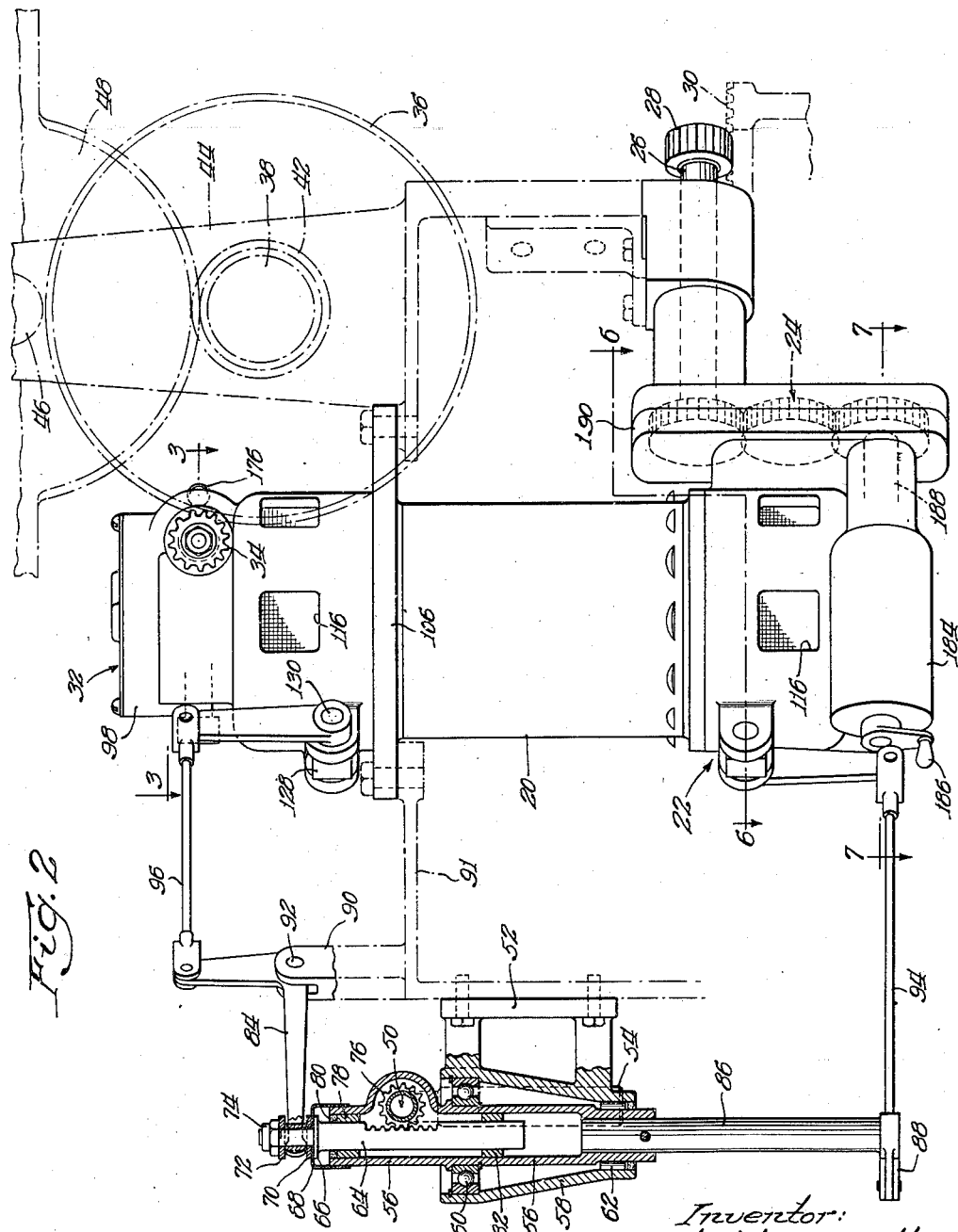

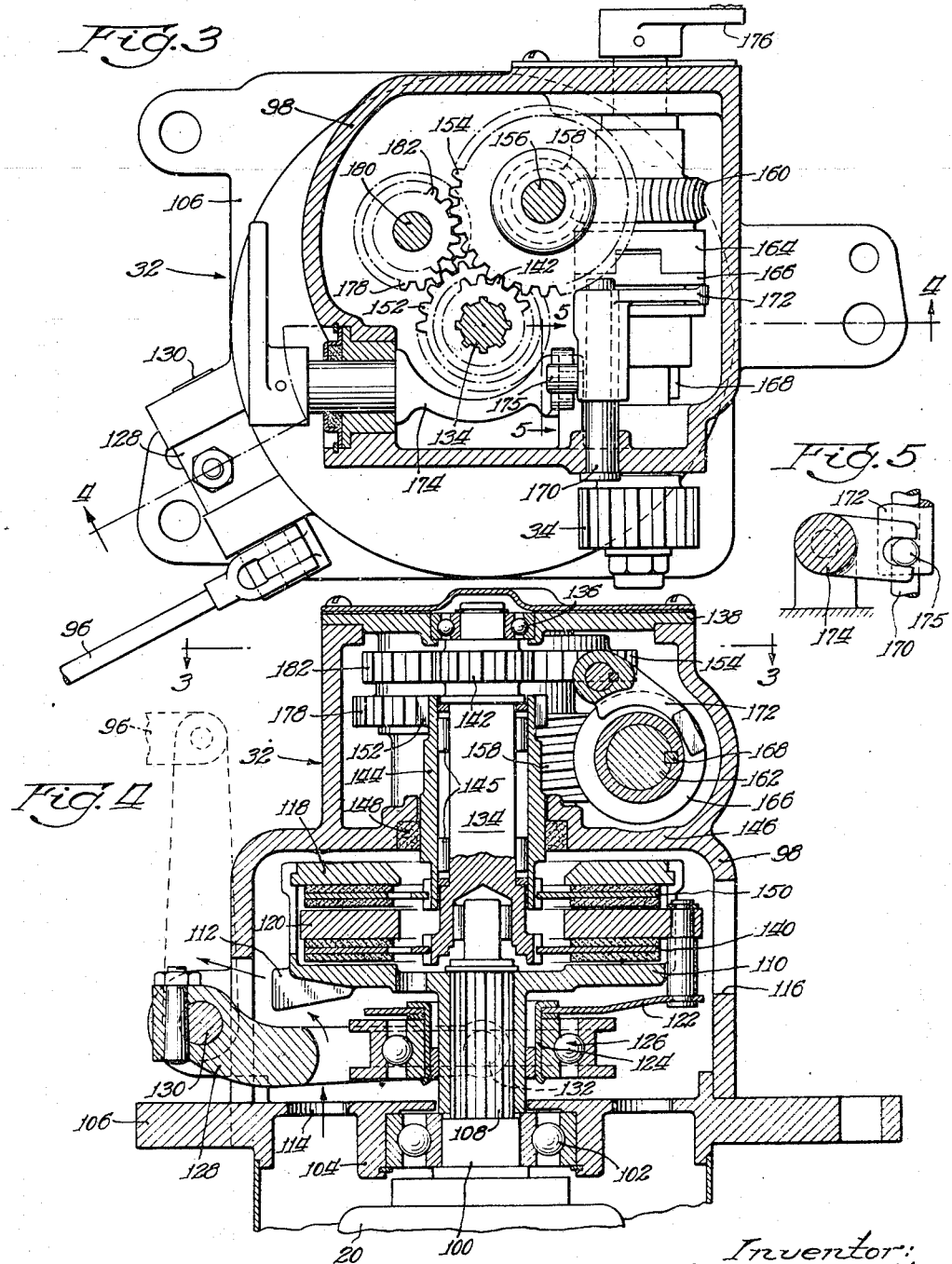

Oct. 18, 1949.  R. C. ZEIDLER  2,484,869
REVERSIBLE PLURAL CLUTCH DRIVE
Filed Jan. 1, 1944  4 Sheets—Sheet 4

Inventor:
Reinhold C. Zeidler
By: Edward C. Fitzpatrick
Atty.

Patented Oct. 18, 1949

2,484,869

UNITED STATES PATENT OFFICE 2,484,869

REVERSIBLE PLURAL CLUTCH DRIVE

Reinhold C. Zeidler, Detroit, Mich., assignor to Borg-Warner Corporation, Chicago, Ill., a corporation of Illinois Application January 1, 1944, Serial No. 516,683

7 Claims. (Cl. 74—389)

This invention relates to an actuating and control apparatus. More particularly, the invention has to do with a friction type clutch actuating and control apparatus for such items as turrets, and especially for turrets of aircraft, tanks and the like. Inasmuch as the device has been developed primarily for use in operating and controlling the turret mechanism of a bomber type airplane, for example, it will be described in this connection. It is understood that it is adaptable to other installations, and, although superior for use in operating an aircraft turret, it is not intended to be limited thereto except as may be provided by the claims.

In the past, turrets for aircraft and the like have usually been operated hydraulically or electrically, or by combination of the two. This has necessitated installation of very heavy and bulky equipment, and has added weight to the bomber, on which the turret was used, which weight has cut down on the effective load or has required additional plane lifting power, and has had other objections. Further, it has been comparatively easy to damage such hydraulic electrical equipment in action, and in most installations even a small injury such as the breaking of an electrical wire by a piece of shrapnel, or the damage to a fluid line in an hydraulic system, has resulted in the device becoming inoperative. Hydraulic accumulators, for example, when punctured frequently "explode" and spray the plane with oil or injure nearby persons and equipment.

It is one object to provide a construction which eliminates much of the weight. In this connection, it is likewise a feature to provide a device which has ruggedness and durability and which will not be easily taken out of operation by flying fragments or the like.

Further, in the past it has been true that hydraulic systems in particular have given much trouble due to "freezing up" in the low temperatures at high altitudes where such aircraft frequently operate. It is an object to disclose a construction wherein the mechanism is not ordinarily troubled in any way by freezing temperatures.

Another very important object of the invention is to provide a construction which is readily serviceable by persons accustomed to servicing automobiles and the like, and in which elimination of hydraulic systems or electric systems eliminates a complicated service problem, the applicant's device being somewhat similar in principle to the mechanism comprising automobile clutches and the like. Ordinarily, an automobile mechanic is fully qualified to service the present invention.

It is another object to provide a construction in which the movements of horizontal and vertical traverse in operating the turret guns and the turret mechanism is handled by a single prime mover, thereby (if desired), eliminating the need for separate prime movers for elevation and azimuth. This cuts down the weight of the installation materially, and at the same time provides for complete flexibility. While it is desirable to use only one prime mover, it is possible by means of what now seems a less desirable installation, to use the device herein disclosed with two prime movers, such as two electric motors, as will be hereinafter more fully explained.

It is an object to disclose a device wherein the weight is materially reduced, the cost is materially reduced, and the space occupied and complexity materially reduced. In this connection, it is noted that with the use of a single motor the weight is reduced to somewhere near 100 pounds under most if not all of the turrets used today, and the cost is reduced to one-tenth, more or less, of the cost of the present turrets. With the use of two motors, there is still a material saving in weight (for example, a saving of 75 pounds), and the cost remains less than other turrets in use today. When it is understood that some planes have as many as five or six turrets to which this device is adaptable, it is seen that the saving in weight, space, cost and servicing difficulty are of prime importance.

Other objects, the advantages and uses of the invention will become apparent after reading the following specification and claims, and after consideration of the drawings forming a part of the specification, wherein:

Fig. 1 is a fragmentary view of one embodiment of the present invention as applied to the operation of a turret and gun mount, the view being somewhat schematic;

Fig. 2 is a fragmentary, vertical, elevational view of the device of Fig. 1, the view being partly in section;

Fig. 3 is a cross-sectional view taken on the lines 3—3 of Figs. 2 and 4 looking in the direction of the arrows;

Fig. 4 is a fragmentary, cross-sectional view taken on the lines 4—4 of Fig. 3 looking in the direction of the arrows;

Fig. 5 is a detailed enlargement taken on the lines 5—5 of Fig. 3, looking in the direction of the arrows;

Like characters of reference designate like parts in the several views.

Figure 6:
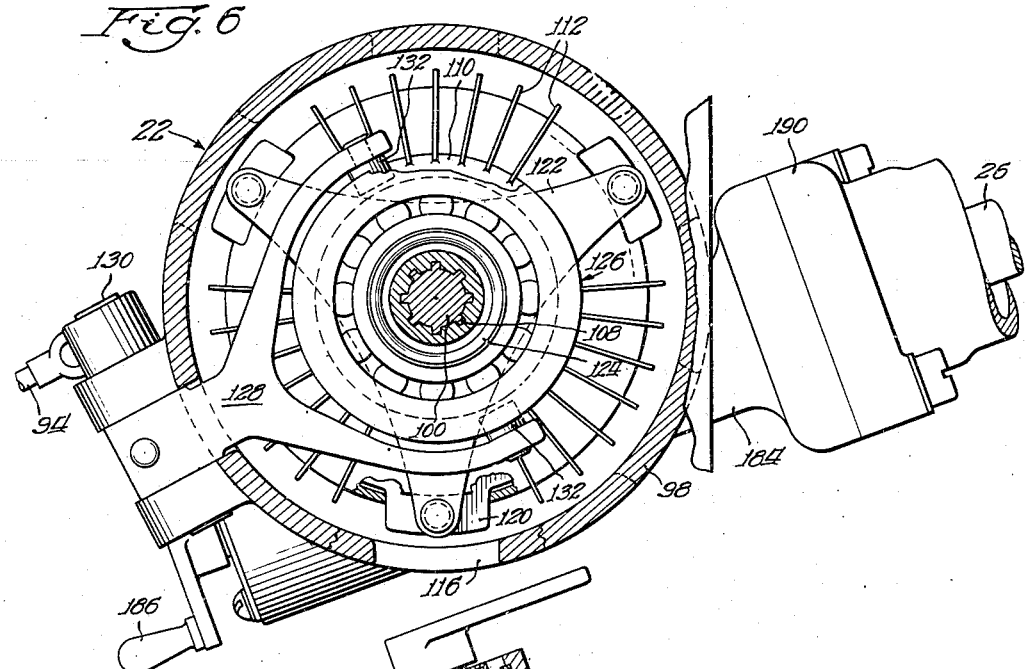
Fig. 6 is a view taken on the lines 6—6 of Fig. 2 looking in the direction of the arrows, the view being partly in cross-section.

Referring more in detail to the figures, and referring first to Figs. 1 and 2, the invention is illustrated as installed in the turret of an airplane, or other craft, the turret shell (not shown) being adapted to ride on bearings or the like while rotating freely in a horizontal arc or azimuth. The turret "top" or shell is not shown, but the operating mechanism disclosed in the drawings generally rotates with the turret. It is understood that the principal mechanism disclosed is carried by the turret itself in the preferred installation, being integrally attached thereto. Driving the turret and mechanism is a prime mover 20, preferably an electric motor of conventional construction. This prime mover 20 is here shown as mounted vertically (see Fig. 2), the turret rotating and actuating mechanism shown broadly at 22, being attached in axial alignment with the motor shaft at the bottom of the prime mover. This actuating mechanism is connected through a gear train 24, (see dotted line arrangement)—preferably enclosed in a housing 198—and a rotatable shaft 26 to an attached driving pinion 28. The pinion 28 is provided with gears or other means engaging a toothed track 30 integral with the device on which the arrangement is installed. Upon a rotation of the shaft 26, and pinion 28, in either direction, the turret will be turned through an arc whereby the guns or the like will transverse the desired azimuth.

At its other end the prime mover 20 is provided with a similar actuating unit 32, which is connected through an intermediate pinion 34 to a driven gear wheel 36 on an axle or shaft 38 to which is attached the gear wheels 40 and 42. This axle 38 is rotatably mounted in a bracket 44, (there being preferably a bracket 44 near each end of the shaft 38), on which likewise may be mounted a gun or guns (not shown) by means of the trunnions 46 (see Fig. 2). A pair of quadrants or sectors 48 having marginal teeth, engage the gear wheels 40 and 42 whereby the desired gear ratio is provided to impart movement to the quadrants 48 and integral guns or other devices carried on the trunnions 46.

A control handle 50 (see Fig. 1) is mounted on a support bracket 52, and is preferably adapted for rotation with the turret, it being contemplated that the operator will likewise be "carried" within the turret.

As will be apparent from Figs. 1 and 2, the control handle 50 may be of any convenient arrangement but preferably is somewhat in the form of handlebars such as used on bicycles, and has the grips 54 whereby the control 50 may be rotated in either direction about its longitudinal axis, and likewise may be swung horizontally about a vertical axis substantially midway between its ends. The handle 50 is carried by means of what may be termed a T-shaped housing or sleeve 56 in which the handle rotates about its longitudinal axis, the housing 56 being likewise adapted to rotate with the handles about the vertical axis. This housing 56 is journaled for rotation in a bearing cup 58 carried on the end of the bracket 52. This bearing cup 58 is preferably provided with bearings 60 and 62 whereby resistance to rotation of the housing 56 about its vertical axis is substantially eliminated. The housing 56 carries, journaled therein for longitudinal movement, a shaft 64 with an integral rack arrangement, which shaft extends upwardly as indicated in Figs. 1 and 2 past the end of the housing 56 and is provided with a shoulder 66 on which is a cover 68, and a retaining washer 70. The shaft 64 is likewise provided with a second collar on which is seated a washer 72, held in place by a nut 74 threaded onto the end of the shaft. The shaft 64 is provided with pinion engaging teeth mating with the pinion 76. The bushing 78 surrounds the shaft 64 and retains the upper end of the shaft 64 in proper alignment, the bushing being topped by a felt washer 80. A ferrule or retainer 82 guides the lower end of the shaft 64. The shaft 64 is adapted to be moved along its longitudinal axis a short distance either way for the purpose of actuating the crank arm 84 which has a bifurcated end portion seating between the washers 70 and 72 and preferably engaging said washers in a rather close but not too binding fit. The housing 56, at its bottom end, is attached by means of a bolt or the like, to a shaft 86, which in turn is attached to the lever 88. With this arrangement, rotation of the control handle 50 about its longitudinal axis results in a raising or lowering of the shaft 64 by the pinion 76 whereby the crank arm 84 is actuated in a manner apparent from Figs. 1 and 2. The crank arm 84 is journaled for movement on a bracket 90 which bracket 90 is attached to frame 91 (which likewise carries the bracket 52), the crank arm being journaled as shown at 92. Thus movement of the control handle 50 about its longitudinal axis swings the crank arm about its journal 92.

Swinging the control 50 about its vertical axis results in horizontal movement of the arms of the T-shaped housing 56 whereby the shaft 86 is rotated, thereby rotating the lever 88 for the purpose hereinafter apparent.

The lever 88 is attached through linkage 94 to the actuating mechanism 22, and controls the operation of said actuating mechanism 22 as will hereafter be shown in a more detailed description of the mechanism therein. The crank arm 84 is similarly attached by linkage 96 to the actuating unit 32 and similarly controls said actuating unit 32. By this means it is seen that by manipulation of the control handle 50, simultaneous or independent operation of the actuating mechanism 22 and actuating unit 32 is secured, and the arrangement is such that rotation of the turret in either direction may be secured and elevation and depression of the guns carried by the quadrant or sector 48 may be secured. It may here be emphasized that only a relatively small movement of said control handle is necessary to effect actuation of either or both, the actuating member 22 or the actuating unit 32.

Referring next to the detailed construction shown in Figs. 3, 4, 5, 6, and 7, and referring first to Figs. 3 and 4, there is shown a detailed arrangement of the mechanism 22 or the actuating unit 32. These may be identical or similar, but as shown in Figs. 3 and 4 a description of the construction will apply either to the actuating mechanism 22 or actuating unit 32.

The actuating unit, for example 32, is provided with a shell or housing 98 adapted to fit on and be retained in axial alignment with the prime mover 20 as clearly apparent from Fig. 4. The shaft 100 of the prime mover extends past the motor housing and is journaled in a bearing 102 carried in a cup portion 104 on what may be termed the end plate 106 forming the separating wall between the motor and the actuating unit 32. This shaft 100 is preferably provided with a splined section 108 over which fits a mating tubular portion of the clutch cover 110, the clutch cover 110 being adapted to rotate at all times with said shaft 100.

The clutch drum, flywheel or driving member 110 (as shown in Fig. 4 and likewise as shown more in detail in Fig. 6), is provided with the fins 112 which draws the air from the area within and surrounding the prime mover 20, through the ports 114 in the end plate 106 and discharges the air out through the openings and ports such as the port 116 in the housing 98. There is thus set up a very effective cooling arrangement which keeps the motor cool as well as cools the other operating parts within the circulating area.

The clutch drum, flywheel or driving member 110 likewise carries a drum end plate or attached driving member 118, which forms a part of the cover proper, and the clutch drum also has a movable, intermediate, driving member 120 carried by driving lugs projecting through slots in drums 110, for rotation with the clutch cover but adapted to be moved laterally for the purpose herein clearly indicated. This intermediate member 120 is attached to an operating spider 122 as is clearly apparent from Figs. 4 and 6. This spider 122 is carried by the member 120, and it is provided with a collar surrounding the tubular splined portion of the member 110, and preferably slidably engages the latter. The channeled ball race 126 is seated in said collar 124 and is retained therein against displacement axially of the motor shaft. A bifurcated clutch operating lever 128, as is most clearly shown in Fig. 6 (the operation of which is best apparent from Fig. 4), is journaled at 130 on the housing 98. This clutch operating lever 128 may be swung about the journal 130 by means of the linkage 96 in a manner which is apparent from the drawings. The ends of the bifurcated portion of the clutch operating lever 128 are provided with the channel engaging pins 132 which are adapted to ride in the channel of the ball race 126. Thus by operation of the linkage 96, the clutch actuating lever 128 may be swung about its journal, and will move the ball race and its integral collar 124 axially of the motor shaft (as extended), carrying the spider 122 and the member 120.

The driven shaft 134 is journaled for rotation in the housing 98, being carried at one end by the bearing 136 in the outer face 138 of the housing 98, and being seated at its other end on a reduced extension of the motor shaft 100, but being free to rotate with respect to said motor shaft. The driven shaft 134 carries the clutch plate 140 which is drivingly connected thereto in the manner clearly apparent in Fig. 4. At its other end, the driven shaft 134 is provided with gear engaging teeth, herein termed a gear 142, the purpose of which will be apparent from further description hereinafter. Overlying the driven shaft 134 in its intermediate portion is a hollow driven shaft 144, which is free to rotate on said shaft 134 by virtue of bearings 145, and which is held against axial movement by shoulders on said shaft 134. The oil retainer 148 surrounding said hollow shaft 144 and seated within a cupped portion of the center housing wall 146 prevents substantial loss of lubricant around said hollow shaft. The shaft 144 has, splined at one end, a clutch plate 150, which is carried by said hollow shaft and is adapted to rotate therewith. The shaft 144 is provided at its other end with the gear teeth 152.

It will be noted that by lateral movement of the movable intermediate member 120 in one direction, the clutch plate 140 is engaged, and the shaft 134 is rotatably driven. This engaging movement of the movable member 120 is preferably only a relatively slight movement and the force of engagement may be varied whereby slippage is permitted, to vary the speed of the shaft 134.

A slight movement of the member 120 in the other direction will cause it to compress the clutch plate 150 for engagement between the drum end plate 118 and the movable member 120 in the same manner that the clutch plate 140 was engaged. When the clutch plate 150 is engaged, however, the plate 140 is in disengaged position and the sleeve 144 is caused to rotate. It is understood that when one plate is engaged, the free plate ordinarily revolves in the opposite direction. This is not objectionable due to the fact that the plate is very light and the polar moment of inertia is small. If desired, an overrunning clutch arrangement may be provided in a manner which is obvious whereby the plates will not be driven in the opposite direction when they are free of driving action by the drum 110. This overrunning clutch could be inserted at various places but likely would be, for example, in connection with the gears 142 and 182, there being an overrunning clutch for each.

It is noted that the movable member 120 has a normal position which is between both plate 140 and plate 150, and spaced from both plates, whereby the cover plate 110, center member 120, and drum end 118, all may rotate without engaging the clutch plates 140 or 150. If the entire assembly is mounted vertically as indicated in Fig. 2, for example, it is quite possible that the plates will just lightly touch the drum members, but the weight of the clutch is such as to overcome any such friction and the light engagement would not be sufficient to cause the turret to swing in azimuth or the guns to be elevated or depressed.

The shaft 134, as above-mentioned, has splined to the end thereof a gear 142. This gear 142 meshes with a gear 154 rotatably carried by shaft 156 fastened in said housing. The shaft 156 has a worm drive 158 thereon, which meshes with the worm gear 160. This worm gear 160 is carried on a driven shaft 162 on one end of which is located the intermediate pinion 34. The worm gear 160 is journaled for free rotation with respect to said shaft 162, but has one element 164 of a jaw clutch integral with said worm gear. The other element 166 of said jaw clutch is splined to said shaft 162 for axial movement thereon, said element 166 being adapted to rotate with said shaft 162, and operatively attached thereto by the splines 168 on the shaft 162. The housing 98, see Fig. 3, carries an inwardly extending support shaft 170 on which is slidably carried a shifter fork or clutch operating lever 172. This lever 172 is adapted to slide axially of the support shaft 170, and is operatively attached to the clutch element 166 whereby said clutch element 166 is free to rotate with the shaft 162, but may be moved axially on the shaft 162 by movement of the lever 172. Carried by the housing 98 and journaled therein for rotation, is a clutch release 174, the end of which is bifurcated and engages a projecting stud portion 175 of the lever 172. This clutch release 174 may be rotated whereby the lever 172 is swung axially on said support shaft 170, thereby causing engagement or disengagement of the jaw clutch elements 164 and 166. A handle of any convenient type is provided for the clutch release 174. It is understood that disengagement of element 166 by operation of the clutch release 174 for the clutch element 164, disengages the shaft 162 from the prime mover 20, and the shaft 162 is thus relieved of the load of the principal clutch mechanism and prime mover, whereby it may be easily operated by means of the hand operating lever 176. This is for use in the event the motor or other actuating mechanism is damaged such as by gun fire.

The hollow shaft 144, as above pointed out has the gear teeth 152 which mesh with a gear 178 rotatably carried on a shaft 180. A second gear 182 integral with gear 178 is provided which meshes with the gear 154. By this arrangement it is seen that when the clutch plate 150 is engaged, the sleeve 144 and gear 152 will cause rotation of the gear 178, and through gear 182 will drive the gear 154 and thereby the worm 158 and worm gear 160, which will operate the intermediate pinion 34 moving the guns either up or down as the case may be. On the other hand, when the clutch plate 148 is engaged the gear 142 on shaft 134 engages the gear 154 and rotates it in a direction opposite to that when the clutch plate 150 is engaged, whereby the shaft 162 and intermediate pinion 34 is driven in the opposite direction. It is therefore apparent that by shifting the linkage 96, the desired direction of movement of the pinion 34 is secured through the mechanism hereinabove described, and the guns or other device operated thereby may be either elevated or lowered. Since only a slight movement is required, this may be accomplished rapidly. By slippage of the clutch plates in the obvious manner the movement may be slowed or otherwise controlled.

In this connection, experiments have determined that the clutch plates have a comparatively long life even when there is what may appear to be excessive slippage. These clutch plates may be replaced if they become damaged or worn out by removing the actuating unit 32, in the obvious manner. Any mechanic capable of servicing an automobile clutch should have no difficulty servicing the device.

Figure 7:
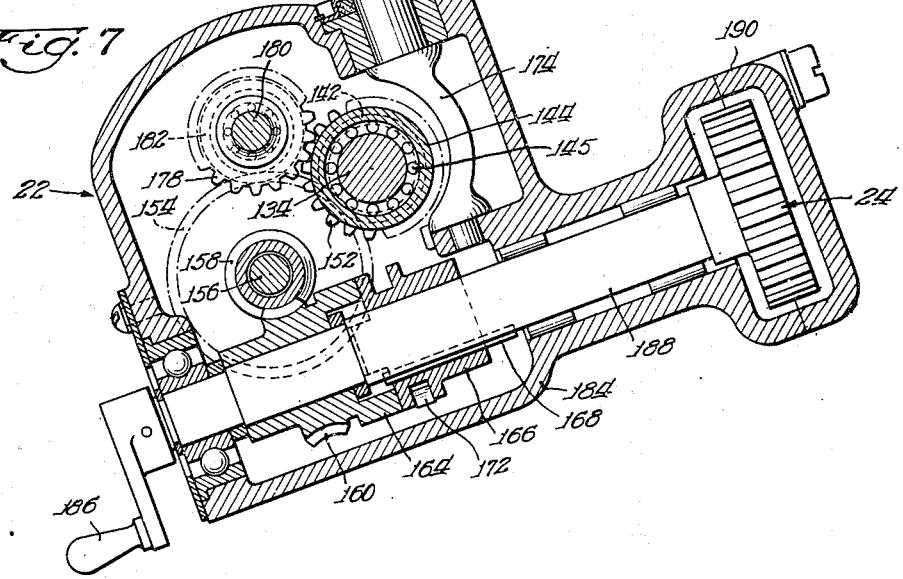
Fig. 7 is a cross-sectional view taken on the lines 7—7 of Fig. 2 looking in the direction of the arrows.

The construction described above is substantially the same as the arrangement of the actuating mechanism 22, with the exception that in the latter there is preferably provided a longer shaft 188, located within the housing 184, which takes the place of the shaft 162 as shown, for example, in Fig. 3. This construction, illustrating the actuating mechanism 22, is clearly set forth in Figs. 7 and 2, and the shaft 188 is shown as operatively connected through a gear train 24 located in the housing 190 to the shaft 26 on which is located the pinion 28. The operating handle 136 is carried by the shaft 188 and serves the same purpose as the operating handle 176—that is, it may be used for operating the turret in the event the motor is out of action. There may be provided also a clutch release for disengaging the driving mechanism by actuation of the jaw clutch as shown in Fig. 7, said jaw clutch being substantially identical to that shown in Fig. 3.

It is thus seen by operation of the linkage 94 in a manner similar to that in connection with the actuating unit 32 (which operation of the linkage 94 is accomplished by swinging the control handle 50 about the shaft 86), the rotation of the turret is controlled.

It is understood that the prime mover 20 normally operates at all times. Thus the necessity of starting and stopping the prime mover with its attendant load on the electrical system or other system operating the prime mover is not present each time the turret is moved or the guns elevated or depressed. The need for two motors is eliminated, although if desired the unit 32 could be used with one motor and the mechanism 22 with the second motor. However by the use of a single motor considerable weight and space are saved.

It is noted that I have shown no brake means to prevent the turret or guns from moving when their respective operating means are in neutral or disengaged position. It is believed such a brake will not ordinarily be necessary due to the comparatively high gear ratios against which the respective devices would be working. However, there are various brakes which would be easily adaptable for this purpose, such as, for example, a magnetic brake which would set automatically when the respective clutch to which it is attached is in neutral position, and which would be released when the clutch is in operating position. Since such a brake arrangement forms no part of this application, none will be described here.

While I have disclosed my invention in connection with certain specific embodiments thereof, it is to be understood that these are by way of example rather than limitation and that the scope of my invention is to be defined by the appended claims which should be construed as broadly as warranted by the prior art.

I claim:

1. In a device having means requiring movement in azimuth and means requiring movement in elevation, a prime mover, four clutch plates mounted for driving connection to said prime mover, clutch means selectively connecting each of said clutch plates to said prime mover, driving connections from one of said clutch plates actuating said device in one direction in azimuth, driving connections from another of said clutch plates actuating said device in another direction of azimuth, driving connections from a third of said clutch plates actuating said device in one direction in elevation, and driving connections from another of said clutch plates actuating said device in the other direction in elevation, said clutch means being operable selectively to actuate either clutch plate in azimuth movement and being operable to actuate either clutch plate in elevational movement, and means whereby said clutch means may be controlled.

2. A mechanism for operating a device for rotary movement in either direction in azimuth, and for elevational movement in either direction substantially perpendicular with respect to said azimuth, said device comprising a prime mover, a pair of friction clutches driven by said prime mover, a pair of clutch plates in each friction clutch, one of said clutch plates of one friction clutch adapted to operate said device in one direction of azimuth and the other of said friction plates in the same friction clutch being adapted to operate the device in the other direction of azimuth, and manual control means selectively engaging said two friction clutches, one of said clutch plates in the other friction clutch being adapted to actuate said device in one direction in elevational movement, and the other clutch plate in said second-mentioned friction clutch being adapted to actuate said device in the other direction in elevation, and manual control means selectively actuating said last two-mentioned clutch plates.

3. A control mechanism comprising a prime mover having a drive shaft; a first double clutch assembly on said drive shaft at one end of said prime mover; driven means actuated by both clutches of said first assembly; means selectively controlling each clutch of said first assembly; a second double clutch assembly on said drive shaft at the other end of said prime mover; driven means actuated by both clutches of said second assembly; means selectively controlling each clutch of said second assembly; and manually operable control means coacting with the respective clutches of each assembly for selectively predetermining the direction of movement of the driven means actuated by the respective first and second clutch assemblies.

4. A mechanism as defined in claim 3 wherein the manually operable control means comprise a bar adapted for axial rotative movement and also for oscillatory movement on an axis perpendicular to said rotative movement; and linkage means operatively connecting said bar to the respective clutches of each clutch assembly, the operation of each clutch being effected in response to the movement of said bar in a selected direction.

5. A control mechanism comprising a prime mover having a drive shaft; a first double clutch assembly on said drive shaft at one end of said prime mover; forward and reverse driven shafts operatively connected to and selectively driven by the respective clutches of said first assembly; means selectively controlling each clutch of said first assembly; a second double clutch assembly on said drive shaft at the other end of said prime mover; forward and reverse driven shafts operatively connected to and selectively driven by the respective clutches of said second assembly; means selectively controlling each clutch of said second assembly; and manually operable control means coacting with the respective clutches of each assembly for selectively predetermining the direction of movement of the driven shafts actuated by the respective first and second clutch assemblies.

6. A control mechanism for a rotatable supporting structure adapted for movement in either direction of azimuth and having thereon a member adapted to be raised or lowered, said control mechanism comprising a prime mover on said rotatable supporting structure having a drive shaft; first and second double clutch assemblies on said drive shaft one at each end of said prime mover; first driven means operatively connecting said supporting structure to said first clutch assembly for moving said supporting structure in either direction of azimuth; second driven means operatively connecting the member on said supporting structure to said second clutch assembly for raising or lowering said member; and manually operable control means coacting with the respective clutches of each assembly for selectively predetermining the direction of movement of said supporting structure and also selectively predetermining the raising or lowering of said member.

7. A mechanism as defined in claim 6 wherein the manually operable control means comprise a bar adapted for axial rotative movement and also for oscillatory movement on an axis perpendicular to said rotative movement; and linkage means operatively connecting said bar to the respective clutches of each clutch assembly, the operation of each clutch being effected in response to the movement of said bar in a selected direction.

REINHOLD C. ZEIDLER.

REFERENCES CITED

The following references are of record in the file of this patent:

UNITED STATES PATENTS

| Number | Name | Date |
|---|---|---|
| 691,254 | Foote | Jan. 14, 1902 |
| 1,020,223 | Sabatino | Mar. 12, 1912 |
| 1,137,953 | Cartwright | May 4, 1915 |
| 1,300,398 | Jaeger | Apr. 15, 1919 |
| 1,465,505 | Zoergiebel | Aug. 21, 1923 |
| 1,560,982 | Fornaca | Nov. 10, 1925 |
| 1,846,687 | Mentor | Feb. 23, 1932 |
| 2,117,852 | Pearman | May 17, 1938 |
| 2,335,926 | Fawick | Dec. 7, 1943 |
| 2,361,385 | Day | Oct. 31, 1944 |
| 2,404,907 | Heynau | July 30, 1946 |
| 2,405,642 | Corte | Aug. 13, 1946 |

FOREIGN PATENTS

| Number | Country | Date |
|---|---|---|
| 436,071 | Great Britain | June 4, 1935 |
| 447,931 | Great Britain | July 15, 1935 |
| 483,847 | Great Britain | Feb. 15, 1937 |
| 545,459 | Great Britain | Apr. 18, 1942 |
| 122,412 | Switzerland | Oct. 1, 1927 |